Feb. 13, 1934.  W. A. GIBBONS ET AL  1,947,080
METHOD AND APPARATUS FOR MAKING ELASTIC FILAMENTS
Filed March 11, 1931   3 Sheets-Sheet 1
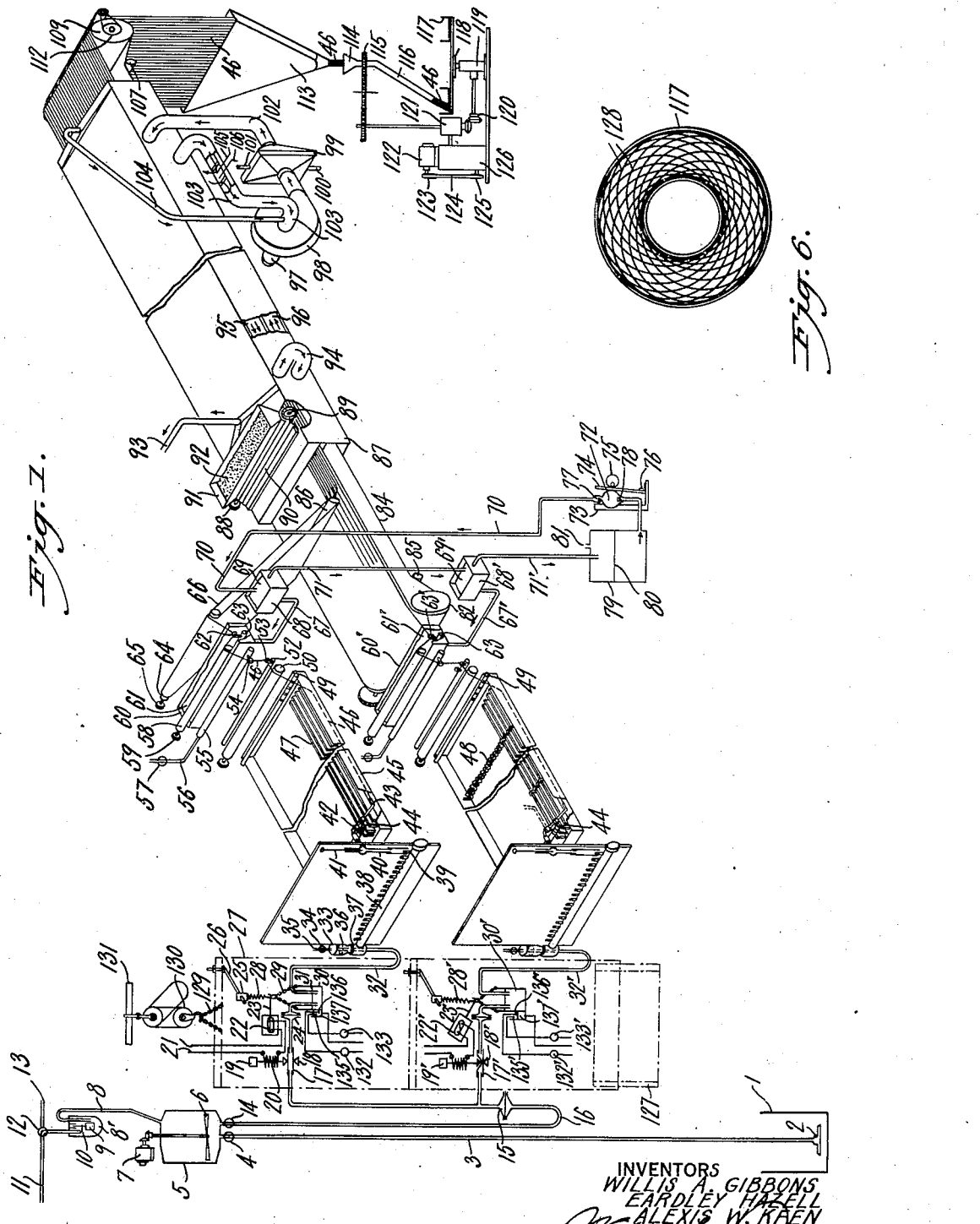
INVENTORS
WILLIS A. GIBBONS
EARDLEY HAZELL
ALEXIS W. KEEN
ATTORNEY

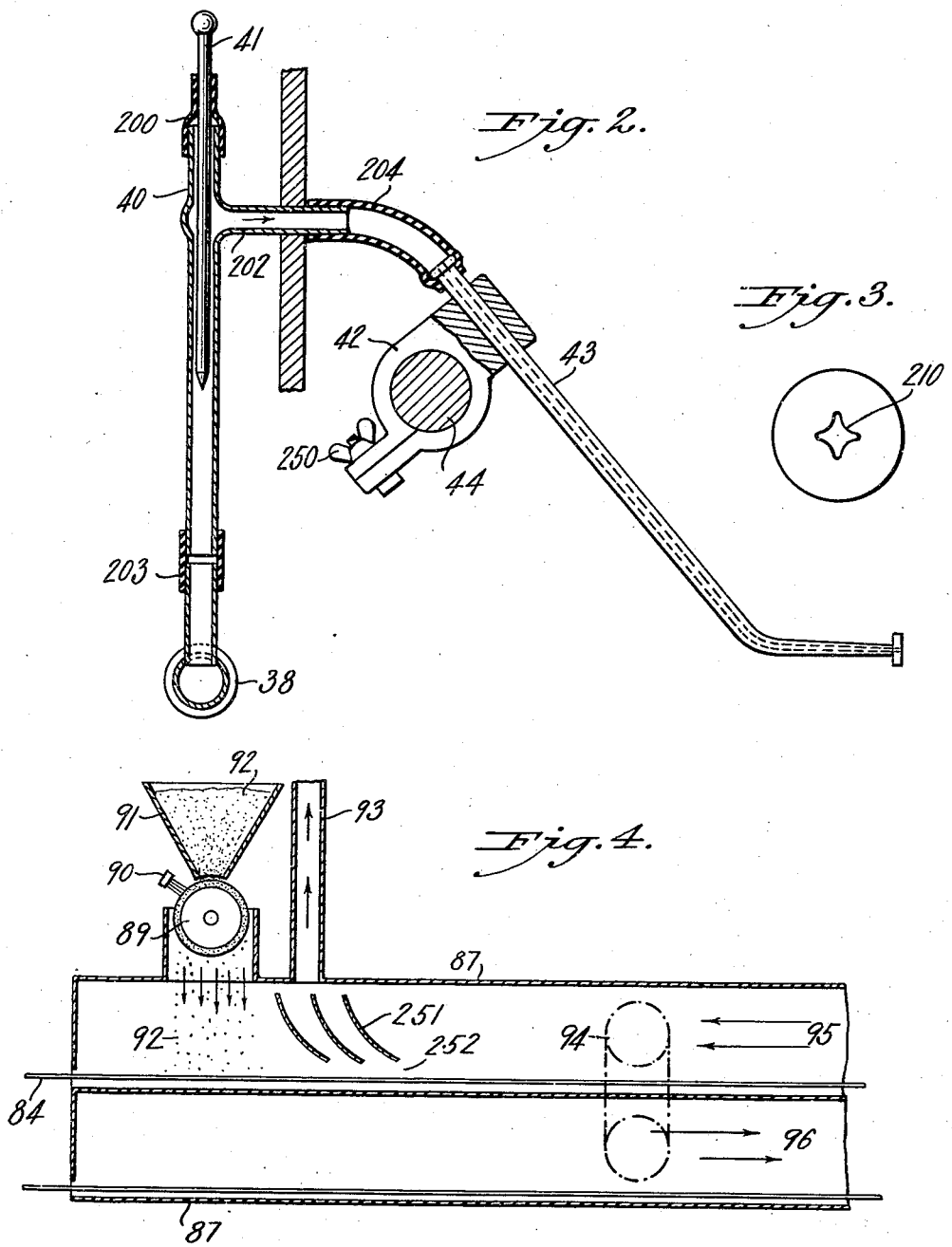

Feb. 13, 1934. W. A. GIBBONS ET AL 1,947,080
METHOD AND APPARATUS FOR MAKING ELASTIC FILAMENTS
Filed March 11, 1931 3 Sheets-Sheet 3
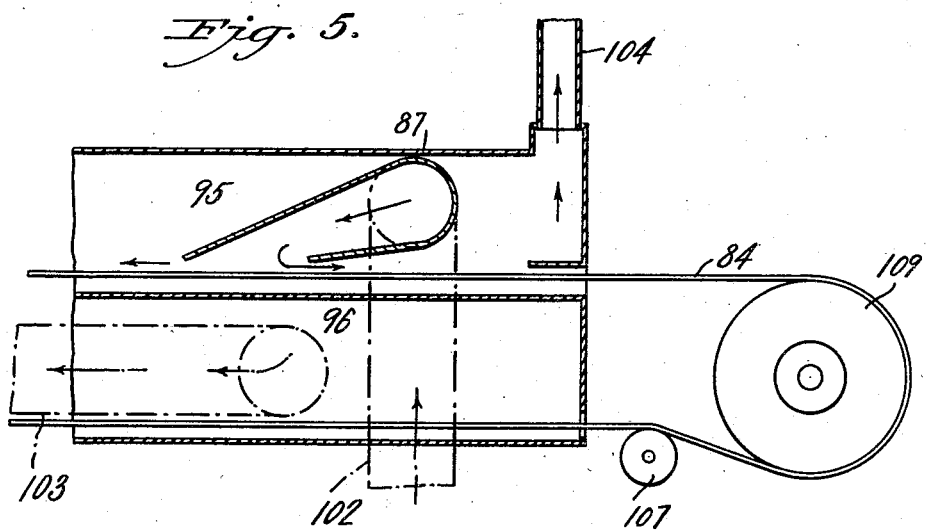
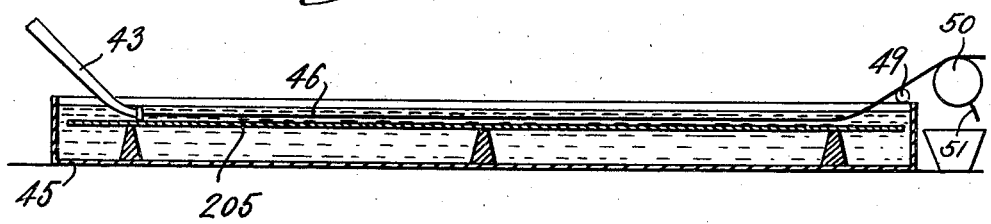
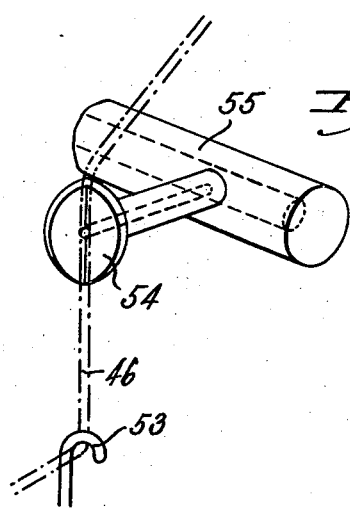
INVENTORS
WILLIS A. GIBBONS
EARDLEY HAZELL
ALEXIS W. KEEN
ATTORNEY Patented Feb. 13, 1934

1,947,080

UNITED STATES PATENT OFFICE 1,947,080

METHOD AND APPARATUS FOR MAKING ELASTIC FILAMENTS

Willis A. Gibbons, Montclair, N. J., Eardley Hazell, New York, N. Y., and Alexis W. Keen, Passaic, N. J., assignors to Revere Rubber Company, Providence, R. I., a corporation of Rhode Island Application March 11, 1931. Serial No. 521,640

18 Claims. (Cl. 18—8)

This invention relates to the manufacture of rubber filaments and has for an object the production of rubber thread of excellent strength and wearing qualities in a manner which gives control over the various factors and conditions to which consideration must be given in the manufacture of a filamentary material of uniform shape, size and quality.

Another object of the invention is to produce a strong rubber filament in a manner which is simple and economical and by which the various operations accomplished to give the desired results are largely automatic, thus eliminating or reducing chances of human inaccuracy and mistake.

Another object is to provide an apparatus by means of which various steps of the novel process may be carried out.

Further objects and advantages of the invention will more clearly appear when reference is had to the following specification and drawings:

The novel process consists briefly in delivering and controlling the quantity, quality and pressure of a water dispersion of rubber while streaming same in a plurality of continuous streams of substantially uniform cross sectional shape and area into a coagulant, withdrawing the coagulated rubber in continuous lengths, washing said lengths in counter currents of water, dusting the lengths to render them non-adhesive, drying them continuously under regulated conditions of heat and evaporation, aggregating the lengths into a hank, coiling the hank in a manner which prevents tangling and knotting of the individual filaments, and then vulcanizing the same. The novel apparatus is designed to carry out the steps above briefly outlined and to provide for regulation and control the various conditions and factors which enter into the process.

In the drawings:

Fig. 1 is a partly diagrammatic and partly isometric view of a group of instrumentalities by means of which the novel process is accomplished.

Fig. 2 is an elevation, with parts in section, of a part of a control means adapted for use with the invention, together with one type of nozzle which may be used.

Fig. 3 is an enlarged end view of the orifice or nozzle through which material is streamed in accordance with this invention.

Fig. 4 is a sectional view of one end of the drying means which accomplishes the drying step of the invention.

Fig. 5 is a sectional view of the other end of same.

Fig. 6 is a plan view of the manner in which the hanks of dried rubber filaments or bands are coiled after formation.

Fig. 7 is a longitudinal sectional view of the acid bath through which rubber material as constructed by the principles of this invention may be led.

Fig. 8 is a perspective view of the washing means used in the practice of this invention.

Referring first to Fig. 1, a suitable rubber dispersion, for example natural latex, is placed in tank 1, valve 4 is opened, 14 is closed and valve 12 is opened to a source of vacuum through pipe line 11. The aqueous dispersion is drawn through a strainer 2 and through conduit 3 into the closed container 5 until filled to a desired level at which time valve 4 is closed and stirrer 6 set in operation to thoroughly agitate the dispersion and cause air bubbles to rise to the surface, from whence they are drawn through the vacuum line 11. This treatment is preferably continued for a considerable period, say one hour. Should valve 4 be inadvertently left open after the tank is filled, the dispersion will be drawn through pipe 8 into a trap 8' and will raise float 9 which is attached to hinged valve 10, thus closing off the vacuum and preventing the loss of liquid.

In inducing the flow through the means for controlling the flow of liquid to the forming apparatus, the vacuum is shut off by turning valve 12 to vent tank 5 to the atmosphere through pipe 13. Now 14 is opened and the liquid flows through line 16, strainer 15 and then through a duplex system one unit of which will now be described. Flow is induced through rubber tubing 17, which leads through a solenoid valve 18, then through additional strainer 24, from whence the liquid passes into constant pressure regulator 30. In order to start the liquid through the tube 32, which leads from the constant pressure regulator, a slight vacuum is put upon pipe 35 which communicates therewith through container 33 and cock 34 is opened until a siphon effect is produced by replacing the air in the tube 32 with liquid. In this manner, the liquid is free to flow from the supply system into the manifold 38, control cylinders 40 and nozzles 43, which will hereinafter be described.

As the container 30 is of uniform cross-section, any addition of liquid will cause a proportionate rise in level relative to the container, at the same time the container 30 will become heavier and sink and at the same time extend spring 28 by means of which the container is adjustably supported from a fixed arm 26. On the other hand, removal of liquid causes a lowering of the level relative to container 30 and a proportionate rise of the entire container due to the removal of weight and which results in a contraction of the spring. The spring may be wound so that over a considerable working range the extension or contraction effected upon the addition or removal of liquid from the container 30, will correspond exactly to the rise or fall in the level of the liquid in the container. Under these conditions, the pressure head relative to the manifold 38 will remain constant regardless of the quantity of liquid in container 30.

In order to supply a continuous flow from container 30 to the manifold 38, means are provided for successively adding liquid to container 30. This is accomplished through the operation of mercury switch 22, rocked by lever arm 23 which is connected to the container suspension 29. The switch is electrically connected to solenoid pinch valve 18, and as shown in the upper unit of Fig. 1, the electrical circuit is closed by the mercury switch when the container is in its raised position. Armature 19 is pulled up by the solenoid and the liquid is free to flow through rubber tube 17 and strainer 24 into container 30. As the container gradually fills, spring 28 extends, lever 23 is depressed and switch 22 is rocked to the position shown at 22' (lower illustration), at which time the circuit is broken and armature 19' drops and pinches the rubber tube 17' against edge 18', closing off the liquid flow. As the liquid flows from the container through pipe 32', spring 28' contracts and switch 22' is again rocked and electrical circuit is again closed and the operating cycle is again begun. The process of regulation thus consists in successive fillings of container 30, while the spring compensation device maintains a constant liquid pressure head relative to manifold 38 through pipe 32. An aqueous rubber dispersion flowing through pipe 32 under the constant pressure effected by a constant head, flows through pipe 37 into the container 33, the aqueous compound being preferably allowed to just cover the top of the pipe 37, which adjustment is made by venting air through cock 34 and pipe 35 until the desired level is reached, at which time the cock is closed. This should be done at a time when all the nozzles 43, hereinafter to be described, are in adjusted position on the manifold and their tips closed by rubber caps or boots (not shown). 36 is an air chamber which functions to cushion shocks that might carry through the liquid to momentarily effect the size of filamentary material which is to be produced, and this chamber also acts as a trap in which any air bubbles carrying through the supply system may be caught.

To regulate the flow of liquid and compensate for differences in resistance to flow through the nozzles, regulators 40 are provided (Figs. 1 and 2). These regulators may consist of small glass plungers 41, extending through the upright cylindrical parts of regulators 40. The plungers are formed to make a relatively loose fit so as to allow the passage of liquid between them and the surrounding cylindrical walls. The further these plungers extend into the cylindrical cavities, the greater the resistance to flow and the less liquid will flow into the horizontal discharge portions 202. Small pieces of rubber tubing 200, may be stretched over the top of the cylindrical top sections of regulators 40, and around plungers 41, in order to form a simple and effective packing gland. The regulators are connected to the manifold 38 through short lengths of rubber tubing 203, and are connected with nozzles 43 through short lengths of rubber tubing 204.

Clips 42 mounted on bar 44 provide an adjustable mounting for nozzles 43, and by rotating the bar all nozzles in position on the bar may be rocked to lift the tips of the entire gang of nozzles at the same time to the position shown in dotted lines in Fig. 1. By suitable adjusting means 250, each nozzle may be lifted separately as may be seen in examining Fig. 2.

Liquid flowing through the nozzles 43, when properly positioned comes in contact with an acid bath in container 45 (Fig. 7). The line 46 shows a filament passing through this bath. The individual filaments are kept apart by run-ways formed by strips 47 (Fig. 1) preferably glass, separated by spacers 48, which rest upon a false bottom 205 (Fig. 7) extending to within a suitable distance, say 1 inch of each end of the acid tray. This provides for a return circulation of the acid set in motion by the filaments as they move through the bath and relieves them of a large part of the frictional drag which they would otherwise encounter. The filaments are drawn through the coagulating bath over the glass spacer 49 by a roll 50, which is driven by suitable means. A rubber wiper 51 may be provided to continuously wipe off any acid which might collect upon the roll 50 by contact with the acid treated filaments and a trough may be placed underneath in order to recover it.

After passing over the roll 50, the coagulated filaments pass under a suitable means such as a glass hook 53, and may be washed. This may be accomplished by jet washers 54, one of which is shown in detail in Fig. 8 to consist of an oval-shaped grooved piece of glass fused to the end of a short length of small tubing. Water is supplied through valve 57 and pipe 56 to manifold 55 upon which a plurality of these jet washers are mounted. In accomplishing the washing of a plurality of filaments which have been passed through the coagulating bath, water from the washer comes in contact therewith and by gravity flows counter to the direction at which the filaments are moving and drops off at the glass hooks 53. This provides an effective counter-current method for washing the filaments free from acid. Roll 58, suitably driven, acts as a booster to help the material along and is advisable on account of elastic properties thereof, the peripheral speed of the roll being preferably slightly greater than that of the roll 50, in order to take up any slack.

After passing over roll 58, the material passes through a bath 61 held in container 60 which may be charged with suitable material such as ammonium hydroxide to neutralize residual acidity and to harden the formed filaments. A suitable roller or hook 62 holds the filaments under the surface of the bath. After passing through the bath the filaments are picked up by a belt 84 (lower illustration of Fig. 1), which is driven by suitable means and is sufficiently wide to hold about twice the full output of filaments which is supplied from the lower coagulating tray. In the case of the upper system, the filaments, after passing through the bath, may be picked up by an auxiliary belt 66, which may carry them down onto the main drive belt 84, and deposit each filament alternately between the ones already laid on the belt from the lower system.

Automatic means of level adjustment to supply the ammonium hydroxide as it is used up from trays 60 and 60', may be provided. This may consist of a container 79 designed to hold a supply of the liquid. In the illustration in Fig. 1. the level is shown at 80. A rubber bulb 72 may be provided with valves 78 and 77 and actuated by a lever 74, pivoted at 76 and motivated by a cam 75 which when actuated causes the bulb to be alternately squeezed and released. When the pressure is removed from the bulb, the valve 77 closes and valve 78 opens, allowing liquid to be sucked into the bulb from the container 79 until full. When the bulb is filled, lever 74 squeezes same and the pressure opens valve 77 and closes valve 78, thus forcing liquid through pipe line 70 in the direction shown by arrows and into the overflow container 68. Any excess flows out through overflow pipe 71 into container 68' and the excess from container 68' flows through overflow pipe 71' back into the original supply in container 79. Container 68 being connected by free passage 67 with container 60, the levels 69 and 61 in the respective containers will be approximately equivalent. The same applies to the lower levels 69' and 61'.

In order to prevent adhesion to the rubber filaments, as they are carried on the belt into the drying apparatus 87, which will be later described, suitable powdered material such as talc 92 may be supplied to the filaments as they enter into the dryer. This talcer may consist of a trough 91 supplied with a horizontal slot at the bottom under which a driven felt roll 89 may be revolved to pick up talc falling through the slot. A small clearance should be allowed so that a sufficient amount of talc may be carried onto the surface of the felt roll. A brush 90 may be provided to brush off talc from the roll from which it falls upon the parallel filaments on belt 84 as they pass underneath. Pipe 93 is an exhaust conduit which assists in preventing excess dust from being carried by hot air currents from the dryer into the room and into other parts of the apparatus. This construction is shown in Figs. 1 and 4.

Air is sucked by fan 98 in the direction shown by the arrows in Fig. 1, through heating means 99. The hot air blows through pipe 102 in the direction of the arrows, and into the upper drying duct 95. The other end of the duct, toward the talcer is blocked off by vanes 251, with the exception of a small passage 252 through which the filaments may be passed.

At the end of the duct, shown in detail in Fig. 4, the drying gases blow through pipe 94 into the lower passage. All the drying gases then travel in the direction indicated by the arrows through duct chute 96, back through pipe 103 to the fan or blower 98. Regulatable dampers 105 and 106 may be provided for the release of saturated gases and admission of fresh air to take the place of the gases exhausted. Pipe 104 (Figs. 1 and 5) may be connected to the intake end of the blower from the top section of the dryer in order to return to the system any gases seeking to escape from the high temperature side of the drying duct. The belt 84 carries the filaments through the drying system and in intimate contact with the hot drying gases which run counter to the direction of travel of the moving filaments. Driven roll 109 is the end support and driver for the belt and may be driven by suitable means. This roll also serves to loosen any threads which might tend to stick to the belt during drying operation. Roll 107 serves as a take-up on the belt.

A wind-up apparatus may be provided to consist of a revolving pipe 116 suitably driven such as by variable drive 126 through reduction gears 121 and connecting gear chain. The drive 126 may also be connected through bevel gears 120, and reduction gears 119 to a shaft and suitable gearing for revolving platform 118. The pipe 116 is preferably driven at approximately the same peripheral speed as the linear speed of the filaments being supplied through guide means 113. The basket 117 on platform 118 is preferably regulated to revolve more slowly, so that the relation in speed of the two movements are approximately 50 R. P. M. for the pipe 116 to 1 R. P. M. of the basket 117. The shaft and bearing structure for the platform 118 is preferably positioned so that it is slightly off the center of rotation of pipe 116, so as the basket turns it will present different areas over which the revolving pipe lays the hanks of rubber filaments 46, as indicated in Fig. 6. Filaments are, therefore, laid in the annular space in basket 117 in paths shown in Fig. 6 at 128. By this means lengths of formed filaments are positioned in the container 117 in such a manner that tangling and twisting is avoided, and the maximum surface is exposed to the air or to a medium effecting vulcanization to which the material is later subjected. Baskets of filaments are removed and placed in vulcanizing apparatus, for instance one which accomplishes vulcanization under water. After this, the filaments are dried, dusted, separated and skeined, chained, or wound in spools as desired.

Variation of individual streamed filaments is adjusted by means of regulators 40 and adjustable plungers 41 as previously described. To account for differences of flow that would effect all nozzles simultaneously, a master controller is supplied by mounting the entire pressure control apparatus on a vertically sliding frame 27 supported at 131 by a chain block 130. Guide means 127 are provided for this vertical sliding adjustment. By means of this arrangement pressure is adjusted simultaneously on the two tray systems, a raising of the frame resulting in an increase in pressure and vice versa.

To assist in an accurate control of the size and uniformity of the thread an indicating system may be provided. This may consist of a mercury well 137 attached to container 30 and two contacts 135 and 136 fixed above the container, one above and set apart from the other. The mercury well itself may supply the third contact. Referring to the lower system, liquid container 30' is shown nearly filled, and as this empties, contact 136' will touch the surface of the mercury, closing the circuit through lamp 132' which may be colored a suitable identifying color, for instance green. As the container continues to rise through depletion of its contents, contact 135' closes the circuit through the container and lights another lamp 133' which may be colored red. The difference of time between the lighting of the green lamp and of the red lamp represents the definite weight of the material withdrawn. The amount of rubber dispersion delivered between successive lightings is constant and can be accurately measured and compared with the required calculated time for delivery of this amount of material which should give a thread of a desired size. With a chart giving this information the operator adjusts the master control until the actual time interval between successive lightings of the colored lights corresponds to the calculated required time. Some small adjustment to balance out differences between the weight of the trays or other slight variations is provided by a screw adjustment which raises or lowers the hangers 26 and 26'.

A nozzle having a round orifice produces in general a round filament. To produce a square or rectangular filament it is necessary to concave the sides inwardly toward the opening as shown in Fig. 3. In such case when the rubber dispersion is extruded into the acid bath the sides 210 tend to bulge out and coagulate into a filament of substantially rectangular cross section. It may be necessary, even with a nozzle of this type, to observe and regulate certain conditions of purity, density and viscosity and other factors in order to produce satisfactory square filaments or filaments of desired angular or irregular shapes.

In practice filaments must be drawn away from the nozzles at a rate greater than the linear speed of the aqueous dispersion through the nozzle tips. Filaments of various cross section and shape such as triangular, pentagonal, etc. may be made and other variations in the shape may be provided for by altering the conditions of the streaming operation. By revolving a particular shaped nozzle a twisted filament of novel appearance is produced. By vibrating the rubber tube immediately in front of the nozzle a material may be produced having the effect of a string of beads. Other variations in the product may be made without departing from the principles herein laid down.

Subject matter not claimed herein is made part of the copending application of Eardley Hazell, Serial No. 521,641 filed concurrently herewith.

Having thus described our invention, what we claim and desire to protect by Letters Patent is:

1. A process for making rubber articles which comprises streaming a water dispersion of rubber into a coagulant under an automatically controlled constant hydrostatic head, continuously withdrawing coagulated streams of rubber from the coagulant, washing said streams free of coagulant, dusting same to render them non-adhesive, and drying in a heated gaseous medium.

2. A process for making rubber articles which comprises flowing uniform streams of a water dispersion of rubber into a coagulant under a constant hydrostatic head, continuously withdrawing coagulated streams of rubber from the coagulant, dusting to render same non-adhesive, and drying in a counter current of a heated gaseous medium.

3. A process for making rubber articles which comprises streaming a water dispersion of rubber into a coagulant, continuously withdrawing coagulated streams of rubber from the coagulant and partially removing excess coagulant, washing with a counter current of water, hardening with ammonia, dusting to render them non-adhesive, and drying in a counter current of a heated gaseous medium.

4. A process of making rubber articles which comprises streaming a water dispersion of rubber in predetermined form and volume and under a predetermined constant pressure into a coagulant, withdrawing streams of coagulated rubber, hardening the same with ammonia, and drying in a heated gaseous medium.

5. A process for making rubber articles which comprises flowing a water dispersion of rubber in a continuous stream of predetermined and uniform cross sectional shape and area into a coagulant, withdrawing the coagulated rubber in a continuous length from the coagulant, washing it, while moving, in a counter current of water, dusting to render it non-adhesive, and drying.

6. A process for making rubber articles which comprises streaming an aqueous dispersion of rubber in predetermined form and under predetermined uniform pressure into a coagulant, withdrawing streams of coagulated rubber and washing same, while moving, in a counter current of water, talcing said streams and drying the same in a heated gaseous medium.

7. A process for making rubber articles which comprises flowing a water dispersion of rubber in a continuous stream of predetermined cross sectional shape and area into a coagulant, withdrawing the coagulated rubber in a continuous length from the coagulant, washing it in a counter current of water, washing it in a hardening bath, dusting it to render it non-adhesive, and drying in a counter current of a heated gaseous medium.

8. A process for making rubber articles which comprises flowing a water dispersion of rubber in a plurality of continuous streams of predetermined and uniform cross sectional shape and area into a coagulant, withdrawing the coagulated rubber in continuous lengths, washing said lengths in separate counter currents of water, dusting to render them non-adhesive, drying, aggregating said lengths into a hank and coiling the latter.

9. In an apparatus for directly making rubber articles in lengths from an aqueous dispersion of rubber, means for continuously flowing a plurality of streams of rubber dispersion, a coagulating bath for receiving said streams, gravity controlled means for delivering said streams to said bath under a constant pressure head, means for withdrawing the coagulated lengths of rubber, an enclosed dryer, and means for conducting said lengths of rubber through said dryer.

10. In an apparatus for directly making rubber articles in lengths from an aqueous dispersion of rubber, means for continuously flowing a plurality of streams of rubber dispersion, a coagulating bath for receiving said streams, means for delivering said streams into said bath under constant pressure, means for withdrawing the coagulated lengths of rubber, an enclosed dryer for receiving said lengths of rubber, and means for supplying a counter current of a heated drying medium to said dryer.

11. In an apparatus for directly making rubber articles in lengths from an aqueous dispersion of rubber, means for continuously flowing a plurality of uniform streams of rubber dispersion, a coagulating bath for receiving said streams, means for withdrawing the coagulated lengths, means for washing said lengths with ammonia, an enclosed dryer, and means for conducting said lengths and a heated gaseous drying medium in opposite directions through said dryer.

12. In an apparatus for directly making rubber articles in lengths from an aqueous dispersion of rubber, means for continuously flowing a plurality of streams of rubber dispersion, a coagulating bath for receiving said streams at one of its ends, means adjacent its opposite end for withdrawing the coagulated lengths of rubber, a false bottom in said bath below the level of the coagulant, whereby coagulant frictionally dragged over said bottom by said lengths to the end where the coagulated lengths are withdrawn may return beneath the bottom to the end adjacent the entry of the dispersion streams, and means for drying the coagulated lengths.

13. In an apparatus for directly making rubber articles in lengths from an aqueous dispersion of rubber, means for continuously flowing a plurality of streams of rubber dispersion, a coagulating bath for receiving said streams, means for drying the coagulated streams, and a washing device intermediate the coagulating bath and drying means, said washing device comprising a series of lower guides for the coagulated streams, a series of upper guides through which the coagulated streams are next led, and means for separately supplying washing fluid to each upper guide, whereby said fluid may flow downwardly in a counter current on each coagulated stream of rubber.

14. In an apparatus for directly making rubber articles in lengths from an aqueous dispersion of rubber, means for continuously flowing a plurality of streams of a rubber dispersion under uniform conditions, a coagulating bath for receiving said streams, means for withdrawing and separately flowing water along each coagulated length of rubber while moving, an enclosed dryer, and means for conducting said lengths of rubber through said dryer.

15. A process for making rubber articles which comprises flowing a compounded water dispersion of rubber in a continuous stream of predetermined cross sectional shape and area into a coagulant, withdrawing the coagulated rubber in a continuous length from the coagulant, washing it in a counter current of water, washing it in ammonia, dusting it to render it non-adhesive, drying in a counter current of a heated gaseous medium, and then vulcanizing same.

16. In an apparatus for directly making rubber articles in lengths from an aqueous dispersion of rubber, means for continuously forming a plurality of streams of rubber dispersion, means for individually controlling the flow of said streams, automatic means for simultaneously controlling the flow of said streams, a coagulating bath for receiving the streams, means for withdrawing the coagulated lengths of rubber, and means for drying them.

17. In an apparatus for directly making rubber articles in lengths from a latex, means for continuously forming a plurality of streams of the latex, automatic and manual means for simultaneously controlling the flow of said streams, means for coagulating said streams, and means for drying said streams.

18. In an apparatus for directly making rubber articles in lengths from a latex, means for continuously forming a plurality of streams of the latex, gravity actuated control means for maintaining a uniform flow of said streams, means for receiving and coagulating said streams, and means for drying said streams.

WILLIS A. GIBBONS.
EARDLEY HAZELL.
ALEXIS W. KEEN.